United States Patent
Manchanda et al.

(10) Patent No.: US 12,141,712 B2
(45) Date of Patent: Nov. 12, 2024

(54) METHOD AND SYSTEM FOR EXTRACTING CONTEXTUAL INFORMATION FROM A KNOWLEDGE BASE

(71) Applicant: Tata Consultancy Services Limited, Mumbai (IN)

(72) Inventors: Sanjeev Manchanda, Mumbai (IN); Ajeet Phansalkar, Mumbai (IN); Mahesh Kshirsagar, Mumbai (IN); Kamlesh Pandurang Mhashilkar, Mumbai (IN); Nihar Ranjan Sahoo, Mumbai (IN); Sonam Yashpal Sharma, Mumbai (IN)

(73) Assignee: Tata Consultancy Services Limited, Mumbai (IN)

( * ) Notice: Subject to any disclaimer, the term of this patent is extended or adjusted under 35 U.S.C. 154(b) by 1001 days.

(21) Appl. No.: 17/124,163

(22) Filed: Dec. 16, 2020

(65) Prior Publication Data
US 2021/0182709 A1   Jun. 17, 2021

(30) Foreign Application Priority Data
Dec. 17, 2019  (IN) .............................. 201921052298

(51) Int. Cl.
*G06F 7/00* (2006.01)
*G06F 16/2457* (2019.01)
(Continued)

(52) U.S. Cl.
CPC ......... *G06N 5/04* (2013.01); *G06F 16/24575* (2019.01); *G06N 20/00* (2019.01)

(58) Field of Classification Search
CPC .... G06F 16/24575; G06F 16/40; G06F 16/48; G06F 16/9535; G06F 16/24578;
(Continued)

(56) References Cited

U.S. PATENT DOCUMENTS 6,243,713 B1 * 6/2001 Nelson ................... G06F 16/40
                                                                704/235
7,349,895 B2 * 3/2008 Liu ......................... G06F 16/58
(Continued)

OTHER PUBLICATIONS

Mezghanni, Imen Bouaziz et al., "Information Retrieval from unstructured Arabic Legal data Title of the item Pacific Rim International Conference on Artificial Intelligence", Aug. 2016, pp. 44-54, IEEE, https://dl.acm.org/doi/10.1007/978-3-319-42911-3_4.
(Continued)

*Primary Examiner* — Mohammad A Sana
(74) *Attorney, Agent, or Firm* — Finnegan, Henderson, Farabow, Garrett & Dunner, LLP

(57) ABSTRACT

This disclosure relates generally to method and system for extracting contextual information from a knowledge base. The method receives a user query comprising a request to extract contextual information from the user query. Further, the user query is analyzed based on a plurality of predefined parameters to determine sufficiency of information comprised in the user query. The received user query identifies relevant sources of the structured data, the unstructured data or the semi-structured data storage repositories. The user query is processed using a fine grain approach, where a dictionary of one or more keywords with weights are created through the domain ontology builder from the one or more knowledge articles. Furthermore, an appropriate contextual information related to the user query is extracted using the fine grain approach, based on the knowledge articles associated with the trained knowledge base comprising information required by the user query extracted from the knowledge articles.

9 Claims, 12 Drawing Sheets

(51) Int. Cl.
*G06N 5/04* (2023.01)
*G06N 20/00* (2019.01)

(58) Field of Classification Search
CPC .. G06F 16/951; G06F 16/7844; G06F 16/685; G06F 16/3346; G06F 16/355; G06F 16/353; G06F 16/35; G06F 16/36; G06N 5/04; G06N 5/22; G06N 20/00
See application file for complete search history.

(56) References Cited

U.S. PATENT DOCUMENTS

2010/0228743 A1* 9/2010 Rappaport ............ G06F 16/951
707/750
2015/0026163 A1* 1/2015 Haggar ............. G06F 16/24578
707/723
2018/0113867 A1 4/2018 Erpenbach et al.

OTHER PUBLICATIONS

Kanoje, Sumitkumar et al., "User Profiling Trends, Techniques and Applications", International Journal of Advance Foundation and Research in Computer (IJAFRC), 2014, vol. 1, Issue 1, arxiv.org, https://arxiv.org/ftp/arxiv/papers/1503/1503.07474.pdf.

Kacem, Ameni, "Personalized Information Retrieval based on Time-Sensitive User Profile", Personalized Information Retrieval based on Time-Sensitive User Profile, 2017, Research Gate, https://hal.archives-ouvertes.fr/tel-01707423/document.

Pandey, Shweta, et al., "Information Retrieval Ranking Using Machine Learning Techniques", Amity International Conference on Artificial Intelligence (AICAI), Feb. 2019, IEEE, https://ieeexplore.ieee.org/document/8701391.

* cited by examiner

METHOD AND SYSTEM FOR EXTRACTING CONTEXTUAL INFORMATION FROM A KNOWLEDGE BASE

PRIORITY CLAIM

The U.S. patent application claims priority under 35 U.S.C § 119 to Indian patent application no. 201921052298, filed on Dec. 17, 2019. The entire contents of the aforementioned application are incorporated herein by reference.

TECHNICAL FIELD

The disclosure herein generally relates to knowledge extraction, more particularly, to method and system for extracting contextual information from a knowledge base.

BACKGROUND

Information retrieval system face several challenges while delivering highly relevant and highly inclusive content in response to a user query. In addition, different users have different requirements and preferences, many of which are not entered as part of the user query. Users commonly do not know exactly what they are looking for when conducting a search. Users often do not have the time to provide explicit parameters of their search. Moreover, users do not always know exactly what they are looking for until they view few results for refining their search. In general, preferences may not be known until several outcomes are experienced. Information filtering system primarily is designed for unstructured or semi structured data for extracting textual information for the given user query. In current scenarios, customer service agents face many difficulties in finding suitable knowledge articles for resolution of customer queries. Due to global growth data or information becomes new currency which upholds abundant amount of data generation through electronic media which makes difficult for the user to get relevant information as desired. Though there are many systems which retrieve the data for the user, but they do not create a user profile which helps in filtering of relevant contextual information.

Many existing systems approach involve extracting information from unstructured documents through ontology of a domain of interest. In another approach, a query-based technique has been used to extract unstructured documents based on one or more user-defined relations from large text database. These approaches also limit in availability of right corpus for training the algorithm and standardizing processes of unstructured data is a challenge. In yet another approach, different text mining techniques and application are utilized for extraction of text from semi-structured and unstructured data text documents. However, these approaches limit in extracting suitable information from knowledge base based on voice-based interactions providing a low-cost efficient retrieval system.

SUMMARY

Embodiments of the present disclosure present technological improvements as solutions to one or more of the above-mentioned technical problems recognized by the inventors in conventional systems. For example, in one embodiment, a method for extracting contextual information from a knowledge base is provided. The system includes receiving a user query comprising a request to extract contextual information from the user query. The system analyses the user query based on a plurality of predefined parameters to determine sufficiency of information comprised in the user query. Then maps using a coarse grain approach, an information associated with the user query based on the sufficiency of information determined in the user query and a ranking score of one or more knowledge articles associated with a trained knowledge base. Then, extracts using a fine grain approach, an appropriate contextual information related to the user query based on the knowledge articles associated with the trained knowledge base. In an embodiment, the fine grain approach performs the steps on the user query for extracting the appropriate contextual information, where a domain ontology builder is generated using the knowledge base based on the one or more knowledge articles obtained from one or more external sources. Then, a plurality of entities for the user query is obtained based on the knowledge base, wherein the plurality of entities includes one or more keywords, an attribute and a base weight and the ranking score is computed for the contextual information associated with the user query based on the plurality of entities closest mapping of the knowledge articles associated with the knowledge base. The base weight is determined based on the user feedback obtained from previous user queries. The ranking score is computed based on the base weight and a concept count, and wherein the concept count is a ratio of total count of one or more concepts to one or more total words associated with the closest knowledge articles from the knowledge base. The coarse grain approach determines relevant knowledge articles for the information associated with the user query.

In another aspect, a method for extracting contextual information from a knowledge base is provided. The method includes receiving a user query comprising a request to extract contextual information from the user query. The system analyses the user query based on a plurality of predefined parameters to determine sufficiency of information comprised in the user query. Then maps using a coarse grain approach, an information associated with the user query based on the sufficiency of information determined in the user query and a ranking score of one or more knowledge articles associated with a trained knowledge base. Then, extracts using a fine grain approach, an appropriate contextual information related to the user query based on the knowledge articles associated with the trained knowledge base. In an embodiment, the fine grain approach performs the steps on the user query for extracting the appropriate contextual information, where a domain ontology builder is generated using the knowledge base based on the one or more knowledge articles obtained from one or more external sources. Then, a plurality of entities for the user query is obtained based on the knowledge base, wherein the plurality of entities includes one or more keywords, an attribute and a base weight and the ranking score is computed for the contextual information associated with the user query based on the plurality of entities closest mapping of the knowledge articles associated with the knowledge base. The base weight is determined based on the user feedback obtained from previous user queries. The ranking score is computed based on the base weight and a concept count, and wherein the concept count is a ratio of total count of one or more concepts to one or more total words associated with the closest knowledge articles from the knowledge base. The coarse grain approach determines relevant knowledge articles for the information associated with the user query.

In yet another aspect, a non-transitory computer readable medium provides one or more non-transitory machine-readable information storage mediums comprising one or more instructions, which when executed by one or more hardware processors perform actions includes an Input/output (I/O) interface and a memory coupled to the processor is capable of executing programmed instructions stored in the processor in the memory to receive a user query comprising a request to extract contextual information from the user query. The system analyses the user query based on a plurality of predefined parameters to determine sufficiency of information comprised in the user query. Then maps using a coarse grain approach, an information associated with the user query based on the sufficiency of information determined in the user query and a ranking score of one or more knowledge articles associated with a trained knowledge base. Then, extracts using a fine grain approach, an appropriate contextual information related to the user query based on the knowledge articles associated with the trained knowledge base. In an embodiment, the fine grain approach performs the steps on the user query for extracting the appropriate contextual information, where a domain ontology builder is generated using the knowledge base based on the one or more knowledge articles obtained from one or more external sources. Then, a plurality of entities for the user query is obtained based on the knowledge base, wherein the plurality of entities includes one or more keywords, an attribute and a base weight and the ranking score is computed for the contextual information associated with the user query based on the plurality of entities closest mapping of the knowledge articles associated with the knowledge base. The base weight is determined based on the user feedback obtained from previous user queries. The ranking score is computed based on the base weight and a concept count, and wherein the concept count is a ratio of total count of one or more concepts to one or more total words associated with the closest knowledge articles from the knowledge base. The coarse grain approach determines relevant knowledge articles for the information associated with the user query.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
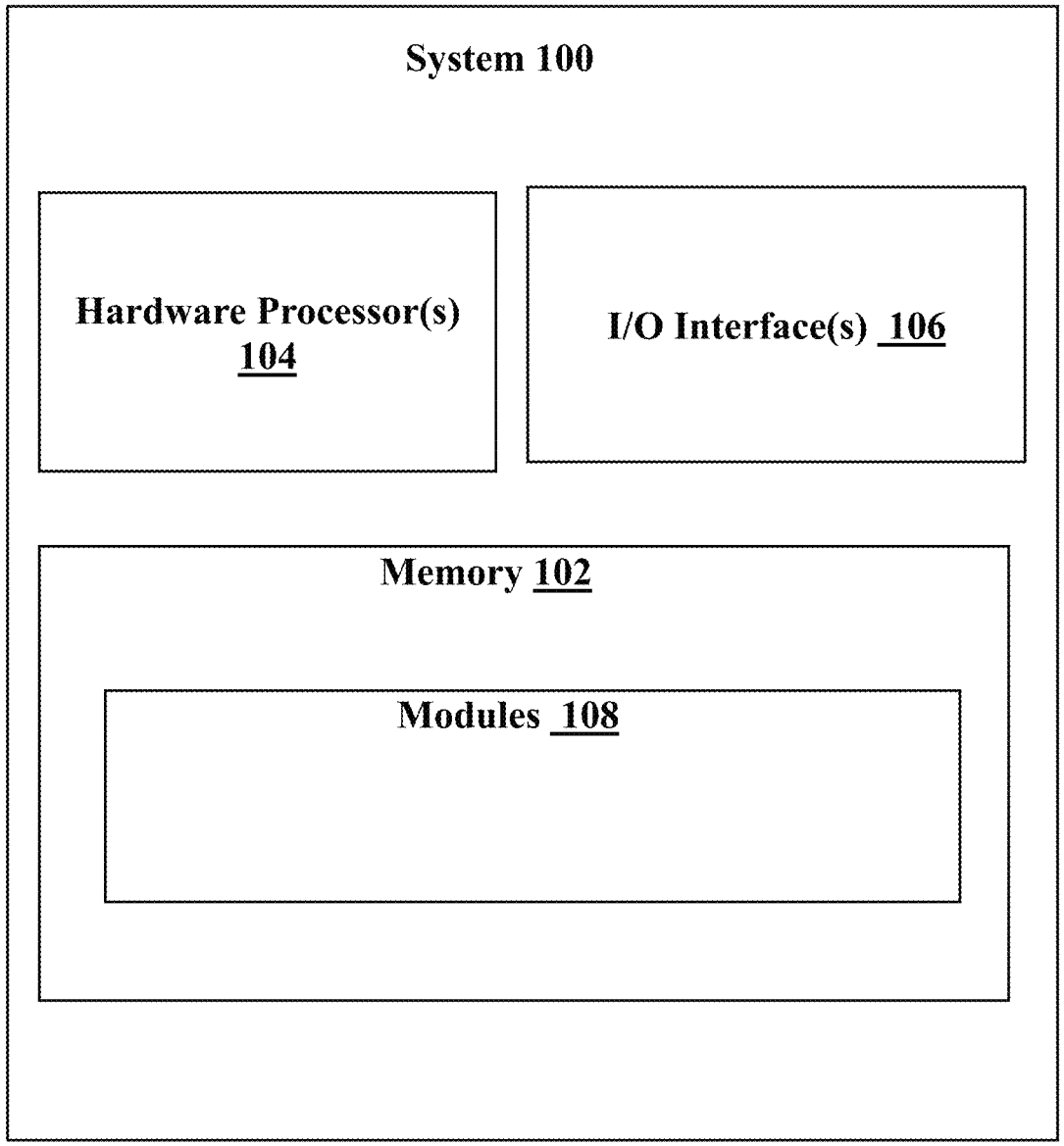
FIG. 1 illustrates an exemplary block diagram of a system (alternatively referred as information filtering system) for extraction of contextual information, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

The embodiments herein provide a method and system for extracting contextual information from a knowledge base. The present disclosure extracts information from one or more knowledge articles associated with the knowledge base for at least one user query. The system may be alternatively referred as information filtering system. Here, the method of the present disclosure provides user profiling from an unstructured data and a structured data using natural language processing techniques and machine learning approach. However, the system focuses facilitating identifying right knowledge articles and suitable context section as a response for the one or more user queries. The user query may include one or more of a text query or a voice based query. The system involves steps such as processing of bulk volumes of data to retrieve most relevant and exact information for the user query based on keywords entered by the user which is an input data. For the received input data, the method of the present disclosure identifies relevant sources of the structured data, the unstructured data or the semi-structured data storage repositories. The system analyzes the input data using the natural language processing (NLP) techniques and filters out key concepts from the input data thereby mapping to required parameters for probable actions. Further, the method of the present disclosure utilizes a trained deep learning model and compares the keywords available in the received user query with knowledge base for a suitable match to resolve the user query. If no suitable match identified for the user query the method of the present disclosure determines the difference between available one or more keywords and required keywords based on the knowledge base and interacts with the user for new parameters to be shared. Further, based on the new parameters received, the method decides the action to be performed for extraction of the contextual information.

Enterprises today are storing various forms of data and the most common data is in the form of structured data in warehouses, documents, audio files, images and thereof. Current analytics focusses on creating and using information extracted and derived from all this data and lack of enterprise information view in co-relation in the existing types of data and the augmented information that the unstructured data can provide with the structured information when relations between the data are established. This could be achieved by creation of an enterprise meta layer model layer encompassing all types of data in the enterprise organization. Moreover, users today expect personalized and contextual information from the systems. Hence, the user feedback in both implicit and explicit becomes one of the most critical components for designing the system. The feedback can either be through an interactive mechanism or through ranking or both. The information available to the users also changes over time or is augmented with more data and hence, it is important that the users have access to the recent information by connecting to the data dynamically. Moving from information to knowledge needs to be enabled by understanding the ecosystem of the user where the information is used in and how it is used in. The implicit knowledge captured in various scenarios can then be used to augment the artificial intelligent systems for contextual information.

Referring now to the drawings, and more particularly to FIG. 1 through FIG. 6D, where similar reference characters denote corresponding features consistently throughout the figures, there are shown preferred embodiments and these embodiments are described in the context of the following exemplary system and/or method.

FIG. 1 illustrates an exemplary block diagram of a system (alternatively referred as information filtering system) for extraction of contextual information, in accordance with some embodiments of the present disclosure. In an embodiment, the information filtering system or system 100 includes processor (s) 104, communication interface (s), alternatively referred as or input/output (I/O) interface(s) 106, and one or more data storage devices or memory 102 operatively coupled to the processor (s) 104. The system 100, with the processor(s) is configured to execute functions of one or more functional blocks of the system 100.

Referring to the components of the system 100, in an embodiment, the processor(s) 104 can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the processor(s) 104 is configured to fetch and execute computer-readable instructions stored in the memory. In an embodiment, the system 100 can be implemented in a variety of computing systems, such as laptop computers, notebooks, 10 hand-held devices, workstations, mainframe computers, servers, a network cloud, and the like.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface (s) 106 can include one or more ports for connecting a number of devices (nodes) of the system 100 to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The modules 108 can be an Integrated Circuit (IC) (not shown), external to the memory 102, implemented using a Field-Programmable Gate Array (FPGA) or an Application-Specific Integrated Circuit (ASIC). The names (or expressions or terms) of the modules of functional block within the modules 108 referred herein, are used for explanation and are not construed to be limitation(s).

Figure 2:
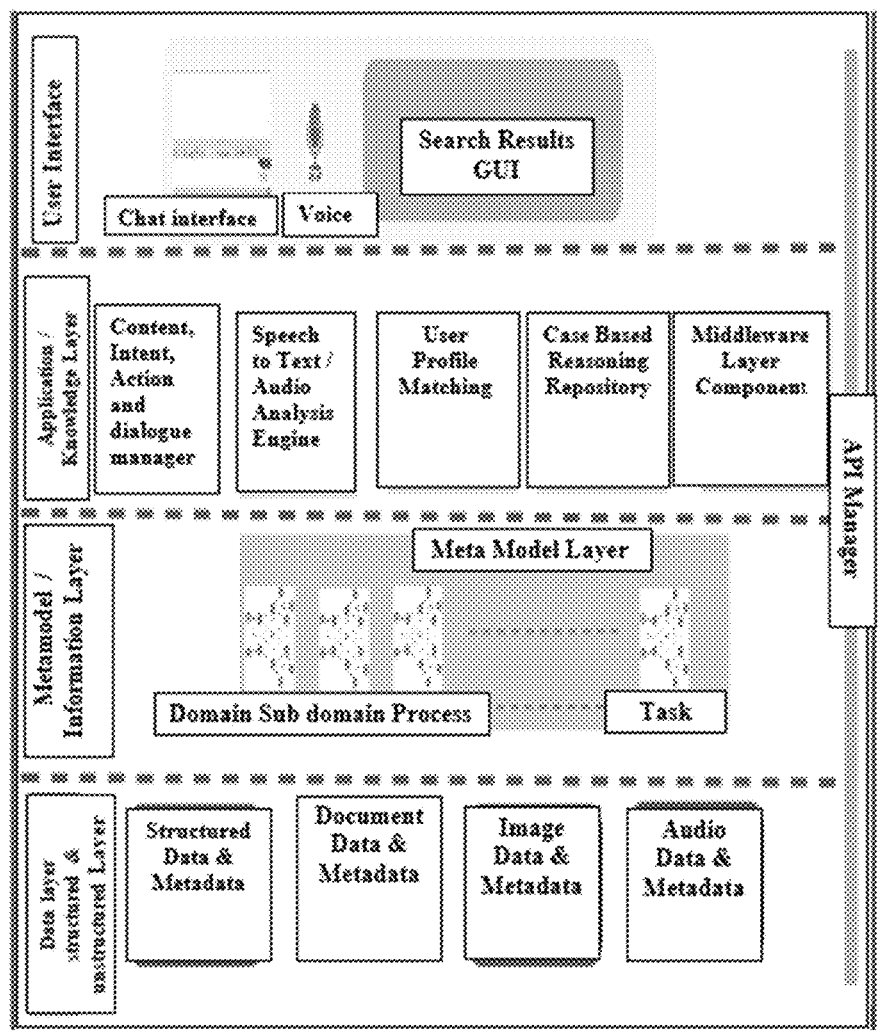
FIG. 2 is a high-level architecture overview of the system of FIG. 1 for contextual information extraction from a knowledge base, in accordance with some embodiments of the present disclosure.

FIG. 2 is a high-level architecture overview of the system of FIG. 1 for contextual information extraction from a knowledge base, in accordance with some embodiments of the present disclosure. FIG. 2 includes a plurality of layers comprising a user interface layer, an application or knowledge layer, a meta model information layer and a data layer. The user interface layer is a primary input source to the system 100, where one or more users or customers provide their query via a text-query or a voice-based query. The user interface layer provides search result interfacing with the system 100 through a chat query or a voice based query. The application or knowledge layer includes workflow of application with required middleware connectors and repositories. The system 100 processes the user input query to extract contextual information from the knowledge base based on one or more knowledge articles. The application or knowledge layer performs various functionalities for processing of the user query such as context, intent, action and dialogue management thereby obtaining relevant information from the knowledge base. For the user query received as voice-based query, an audio analysis engine converts the voice based query into the text query. Further, the user profile matching is performed on the user query matching the user to extract relevant information from the knowledge base. The meta model information layer creates a model graph from the user query having domain or sub-domain data for processing of task. The data layer comprises of the knowledge base with the structured data, the unstructured data, the one or more knowledge articles, the image data and the audio data. The structured data can be stored in the tabular format for example customer sales transactions, where the unstructured data is like natural language-based interactions, text documents, speech or images and thereof.

Figure 3:
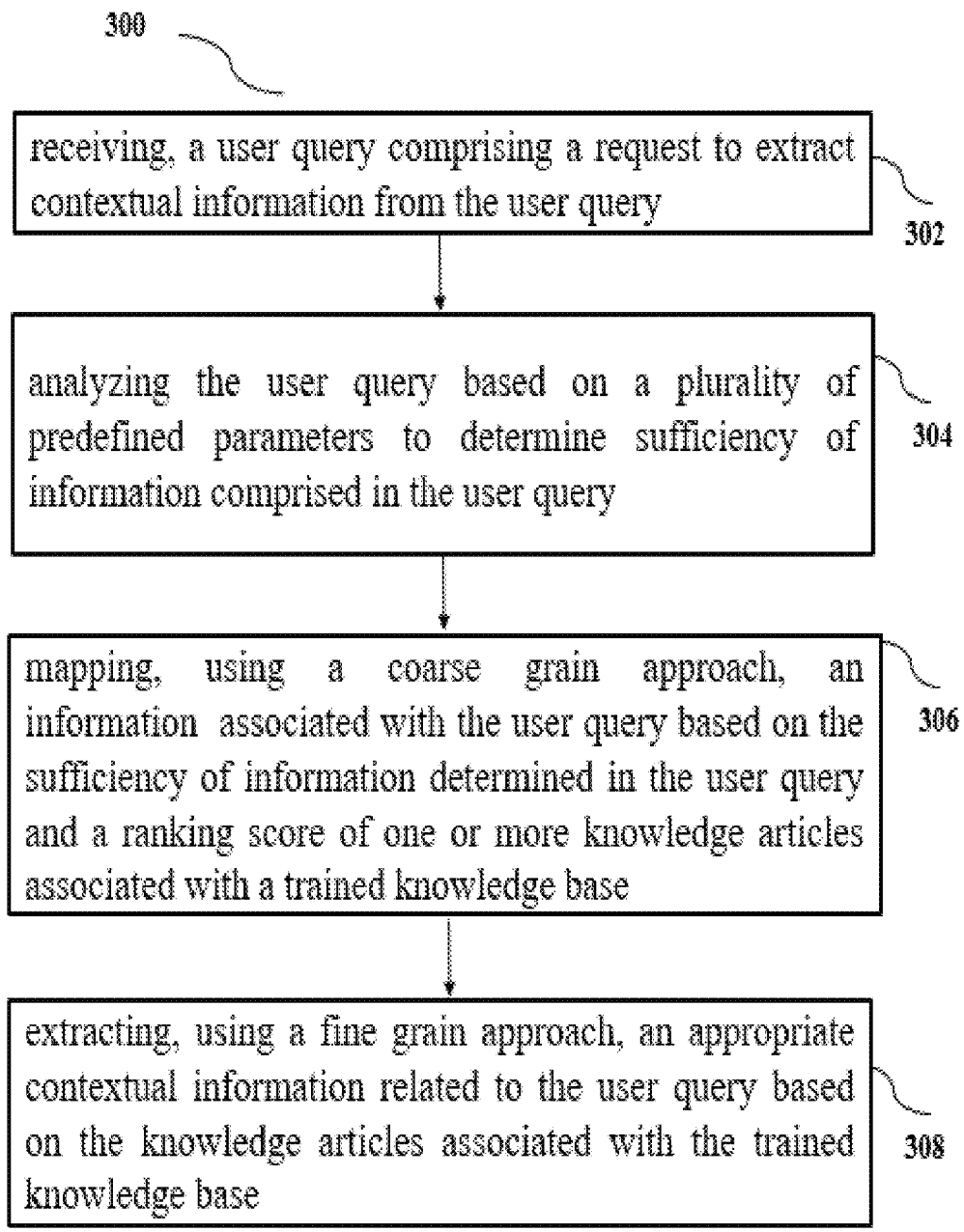
FIG. 3 depicts a flow diagram illustrating a method for extracting contextual information using the system 100, in accordance with some embodiments of the present disclosure.

FIG. 3 depicts a flow diagram illustrating a method for extracting contextual information using the system 100 of FIG. 1, in accordance with some embodiments of the present disclosure. In an embodiment, the system 100 comprises one or more data storage devices or the memory 102 operatively coupled to the processor(s) 104 and is configured to store instructions for execution of steps of the method 300 by the processor(s) or one or more hardware processors 104. The steps of the method 300 of the present disclosure will now be explained with reference to the components or blocks of the system 100 as depicted in FIG. 1 and FIG. 2 and the steps of flow diagram as depicted in FIG. 3. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring now to the steps of the method 300, at step 302, the one or more hardware processors 104 receive a user query comprising a request to extract contextual information from the user query. Considering an example where the system 100 receives the user query as the voice query or the text query. Every user registered in the system 100 has a personal profile according from which the information is retrieved. The system 100 collects information about one or more entities in all possible form such as text, images, videos, links, social media reviews and other forms. The meta model layer comprising metadata of all the data forms processes the user or natural query received by the system 100 to retrieve relevant information and the retrieved information. is filtered as per the user profile. Further, relevant contextual information is extracted from the knowledge base based on the user profile. In one embodiment, consider a scenario, where customer service agents face many difficulties in finding suitable knowledge article from the one or more knowledge articles for resolution of customers user queries. The present disclosure helps customer service agents finding suitable knowledge articles as well as specific sections of text within the knowledge articles for resolution of user query through extraction of keywords from user interactions with customer service agents. Here, the method of the present disclosure includes three approaches for resolution of each user query, 1. a coarse grain approach to identify knowledge article IDs and 2. a fine grain approach for identifying knowledge article ID and 3. a self-service approach. The three approaches for annotation of knowledge articles, dataset setup, experimental details of different algorithms with results are described below.

Referring now to the steps of the method 300, at step 304, the one or more hardware processors 104 analyze the user query based on a plurality of predefined parameters to determine sufficiency of information comprised in the user query. Sufficiency of information is required to identify automated right knowledge article ID for extraction of contextual knowledge from the one or more knowledge articles for customer service agent(s) to respond interactions posted via various channels of external input sources such as e-mail, chat, phone call, portal or general note etc. Although sufficiency of information is the key objective for data cleansing, preparing data for suitable training and making outcomes available for customer service agents is essentially required. Further, collaborative execution processing is based on the self-service approach, where a dictionary of one or more keywords with weights is created through a domain ontology builder from the one or more knowledge articles. This dictionary is used for helping user in finding exact information and relevant document for future queries. Further, a new user query is compared with the dictionary created by the domain ontology builder to extract one or more keywords from the user query and then these keywords are utilized to find the steps of the action to be performed automatically where the system 100 triggers the action as per its training using machine learning algorithms to execute steps of task.

Referring now to the steps of the method 300, at step 306, the one or more hardware processors 104 map using a coarse grain approach, an information associated with the user query based on the sufficiency of information determined in the user query and a ranking score of one or more knowledge articles associated with a trained knowledge base. Referring to the above example the context management comprises of the user profile related context which is managed in a configurable way where machine learning based alignment is to filter. The user interface extracts right information and specific information with minimal number of clicks. Further, the coarse grain approach identifies appropriate knowledge article associated with the knowledge base that contains information required by the user query and then extracts information from the knowledge articles. The content based filter processing is based on the coarse grain approach, where the user can find most relevant information required from the knowledge articles that contains exact information required by the user. Here, one or more machine learning algorithms are trained with the knowledge base having user interactions, referenced knowledge articles with keywords. The model generated post training finds relevant knowledge article for new interaction.

Further, the present disclosure filters out irrelevant data from the incoming data stream and distribute relevant data item based on the user query. The method provides all types of relevant data structured and unstructured data in the form of text, images, videos, web link and social media. The method provides extraction of relevant information for all type of users at different levels viz. strategic, management and operational levels. The method also creates a model for each user which helps in facilitating relevant information, based on the user profile facilitates with dynamic data which is further available in all forms within databases, internet and social media. Further, the method identifies incorrect and incomplete information to clean the data. Filtering the information and ranking the information is based on the user profile. Further, the method involves continuous feedback mechanism based on the user feedback as well as automated monitoring of user's actions or patterns to improve weightage of key domain terms and documents in repositories.

Referring now to the steps of the method 300, at step 308, the one or more hardware processors 104 extract using a fine grain approach, an appropriate contextual information related to the user query based on the knowledge articles associated with the trained knowledge base. In fine grain approach the method identifies appropriate sections from the one or more knowledge articles associated with the knowledge base required by the user query. The user query is processed using the fine grain approach, where the dictionary of one or more keywords with weights are created through the domain ontology builder from the one or more knowledge articles. This dictionary is used to find exact information or relevant document for future user queries. Further, a new user query is compared with the dictionary created by the domain ontology builder to extract one or more keywords in the user query and these keywords are used to find suitable knowledge article and a specific section of that knowledge article to find the steps to resolve queries of user. Here, the domain ontology builder generates the knowledge base based on the one or more knowledge articles obtained from one or more external sources. The domain ontology builder extracts concepts or one or more keywords from the knowledge articles with base weights and other attributes. For the said user query a plurality of entities are obtained based on the knowledge base, wherein the plurality of entities includes one or more keywords, an attribute and a base weight as depicted in Table 1,

TABLE 1

Knowledge article extraction

Algorithm for Knowledge extraction from knowledge articles
Input : Interactions Set T ← {$t_1, t_2, t_3, t_4, ... t_m$ }, Knowledge Articles Set K←
{$k_1, k_2, k_3, k_4, ... k_n$}, Domain Dictionary d ← null, Annotations Set A ← null,
Feedback Set F ← null, Model M ←null, New Interactions N ←
{$n_1, n_2, n_3, n_4, ... n_p$}
Output: Prediction Set P
1:    Initialize A← null, D← null, F← null, i←1, j←1
2 :    while i<=n do
3:      Extract Concepts from knowledge article $k_i$
4:      D← D U Domani ontology builder ($k_i$) where $k_i$ ∈ K
5:      Increment i← i+1
6:    end while
7:    while j<=m do
8:      Map Concepts in Interactions T with Dictionary D and Annotate
knowledge articles
A← A U User annotation (Concept Mapping ($t_j$, D))
Increment j← j+1
9:    end while
10:    Generate machine learning model using interactions Set T, Annotations Set A
and Feedback Set F
M ← Machine learning algorithm (T, A, F)
11:    Predict sections of knowledge articles using machine learning model M
P← Predictions (M,N)
12:    Collect User feedback F
F← User Feedback (N,P)
13:    Iterate the algorithm for new inputs received from user
    a)  For new knowledge article addition in corpus k ∈ K, Repeat step 2
    b)  Fore User Feedback on Prediction of latest interactions f ∈ F, Repeat step 10
    c)  For new interactions n ∈ N, Repeat step 11
14:    end The base weight is determined based on the user feedback obtained from the previous user queries. Further concept or keyword and its attributes are fixed whereas same concept or keyword that appear in one or more knowledge articles, and concept or keyword has 1:M relationship with documents. The knowledge article ID are used to access the one or more knowledge articles from the knowledge base. The ratio of concept frequency versus overall word count ratio depicts the total count of the concept to the total words in the knowledge articles. The ratio of concept frequency versus all concepts total count ratio is the total count of the concept and the total concepts in the one or more knowledge articles. The 'yes', 'no' and 'partial match' count used for storing user feedback on the matched, unmatched knowledge articles ID.

Further, the ranking score is computed for extracting the contextual information associated with the user query based on the plurality of entities closest mapping of the knowledge articles associated with the knowledge base. The feedback from the user is captured in the dictionaries and appropriate ranking score is calculated using the below mentioned equation based on mapping the closest knowledge articles and as described in Table 2, $$f(x)=\Sigma_{i=1}^{n}((\% \text{ ConceptCountBased}*\text{Weight})+(\text{Yes}_i-\text{No}_i)*\text{Delta}) \quad \text{equation1}$$

Note: i=concept found in n documents

TABLE 2

Example Scenario

| Concept | Doc ID | Doc Link | Weight | Ratio 1 | Ratio 2 | Yes_Count | No_Count | Partial_Count |
|---|---|---|---|---|---|---|---|---|
| X | Doc1 | | 1 | 5 | 25 | 5 | 2 | |
| X | Doc2 | | 1 | 10 | 40 | 10 | 4 | |
| Y | Doc1 | | 1 | 5 | 20 | 8 | 3 | |

Calculation for X & Y Concept for Doc1 based on above formulae and Data:

1*0.25+(5−2)*0.01+(1*(0.20)+(8−3)*0.01=0.53

Calculation for X Concept for Doc2 based on above formulae:

1*0.4+(10−4)*0.01=0.46

The knowledge article having higher ranking score is overall weightage. Further, the one or machine learning models are trained for information retrieval using the rank of documents. The deep learning neural network model is trained from historical interactions to find required keywords from the user queries, if any keyword is not made available by the user then system forms natural language questions for the user to facilitate required information to fill gaps. The base weights of the keywords received from the domain ontology builder is further improved with the help of user feedback, then deep learning algorithm utilizes these weights in finding right information or actions.

In another embodiment, experimental and comparative analysis of results for information filtering system, corpus of 169 knowledge articles and 11546 customer interactions were used. There are multiple interactions for same case number, so these interactions were merged, and count of unique interactions reduced to 2677 instances. In most of the cases, each case number references to one knowledge article, but very few instances where two knowledge articles were also referenced. Merging of interactions with key combination of case number and the knowledge articles i.e., two rows were created for interactions having two knowledge articles referenced for same case number as depicted below in Table 3,

TABLE 3

Experimental results of different algorithms

| S. No | Algorithm | Accuracy | Precision | Recall | F1 Score |
|---|---|---|---|---|---|
| 1 | Gaussian NB | 0.73 | 0.77 | 0.73 | 0.71 |
| 2 | Logistic Regression | 0.87 | 0.90 | 0.87 | 0.87 |
| 3 | Linear SVM | 0.91 | 0.93 | 0.91 | 0.92 |
| 4 | Gradient Boosting | 0.88 | 0.89 | 0.88 | 0.87 |
| 5 | Random Forest | 0.79 | 0.82 | 0.79 | 0.79 |
| 6 | Deep learning NN | 0.95 | 0.92 | 0.90 | 0.91 |

This data was further used as training data of about 80% and testing data of about 20% for validation and testing the results of different algorithms. For evaluation and comparison of results using Gaussian Naive Bayes, Logistic Regression, Linear Support Vector Machine (Linear SVM), Gradient Boosting, Random Forest and Deep Learning Deep Learning Neural Network Algorithm) Algorithms were experimented. Table 3 includes the results generated by different algorithms. Output results show that deep learning neural networks perform well as compared to other algorithms when experimentation is performed for 10 epochs for finding knowledge article IDs. Traditional algorithms such as Linear SVM perform slightly lesser than deep learning algorithm. Gaussian Naïve Bayes and Random Forest Algorithms perform poorly due to the reason that these algorithms are more suitable for discrete data points, whereas neural networks and regression-based algorithms perform better for unstructured text input data is converted into floating numbers before processing. Deep Neural Networks improve results with more training data and increased epochs, which has helped remarkable recognition of Deep Learning Neural Networks, for real life complex problem solving. This system is automated to create Concepts' dictionary and annotation of data. Annotation of data will be done through various specified ways earlier.

Figure 4A:
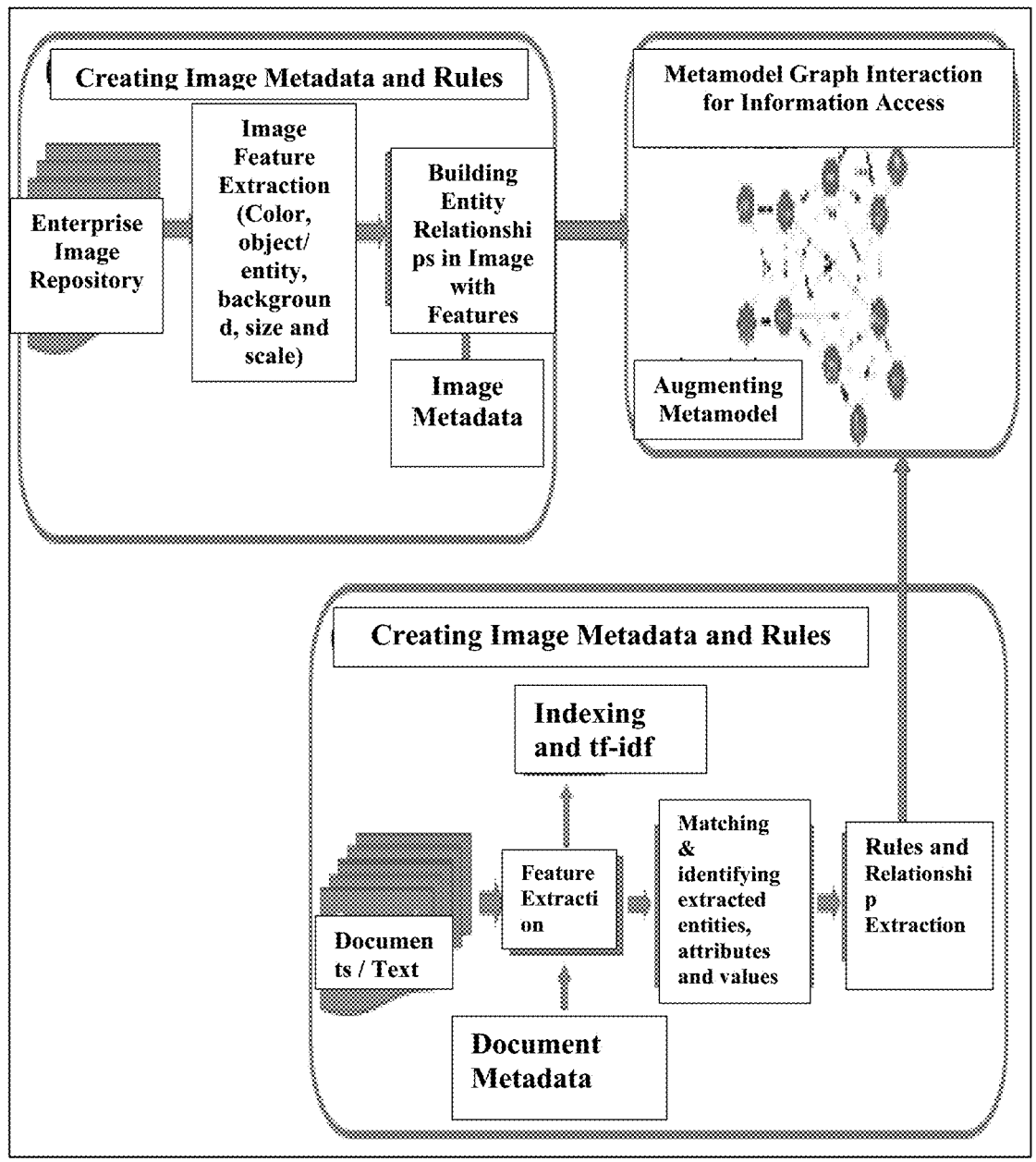
FIG. 4A and FIG. 4B illustrates augmentation of metamodel layer creating metamodel graphs for an unstructured and an structured data using the system of FIG. 1, in accordance with some embodiments of the present disclosure.
Figure 4B:
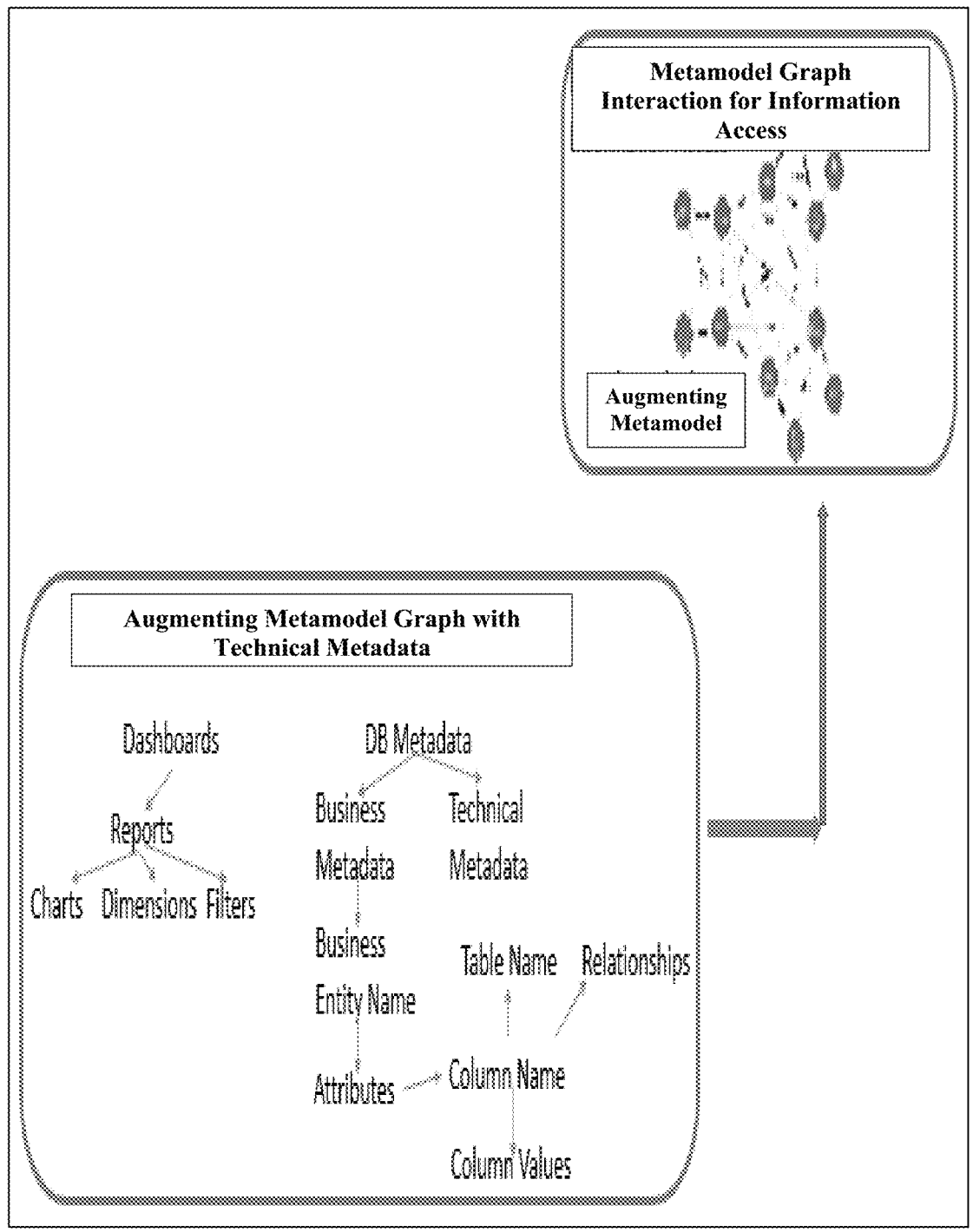

FIG. 4A and FIG. 4B illustrate augmentation of meta-model layer for? creating metamodel graphs for an unstructured and a structured data using the system of FIG. 1, in accordance with some embodiments of the present disclosure. Focus of this system is on searching suitable knowledge articles as well as suitable context of unstructured information within these knowledge articles based on interactions, to resolve user queries. Data cleansing is the data quality of customer interactions in repository which is automated for identification/correction of incorrect, incomplete data elements to clean the data and to update missing data elements in interactions. Further, data annotation makes the system learn, training data need to be annotated or tagged, so that system can identify appropriate text section within a knowledge article. Annotation of contextual knowledge in knowledge articles is very exhaustive and there is a need to automate annotation or tagging of contextual knowledge in knowledge articles. Here, customer service agents interact with users through multiple channels and then connect to different back end systems to resolve those queries.

Figure 5A:
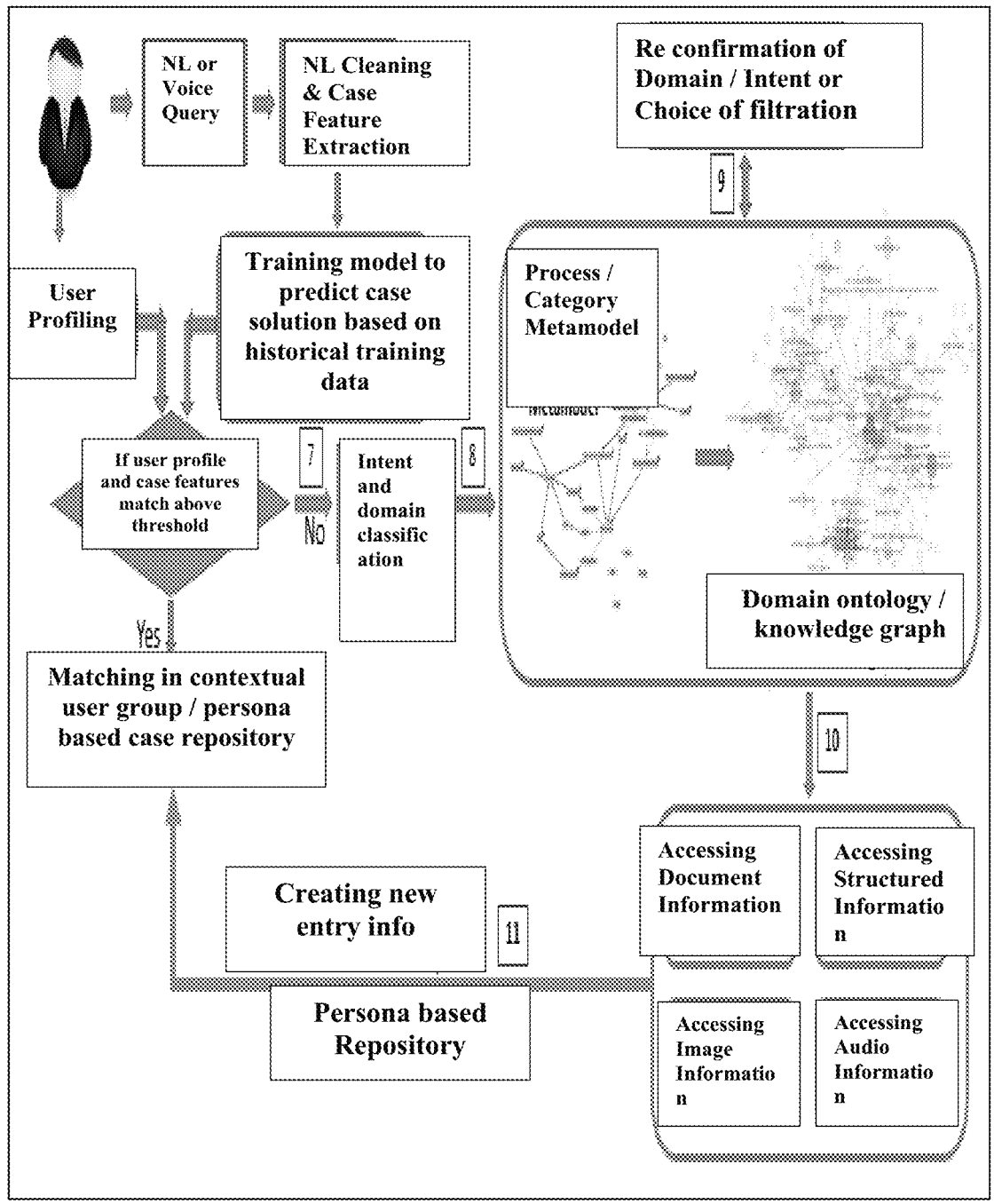
FIG. 5A illustrates an example depicting processing of user query to update user persona based on user's feedback using the system of FIG. 1, in accordance with some embodiments of the present disclosure.

FIG. 5A illustrates an example depicting processing of user query to update user persona based on user's feedback using the system of FIG. 1, in accordance with some embodiments of the present disclosure. In one embodiment, for the coarse grain approach, the system 100 helps/enables the customer service agents in finding right knowledge article IDs only. Followed by that customer service agents need to traverse through contents manually to find suitable section of knowledge article for answering user query. One knowledge article may contain resolution for multiple queries, so the coarse grain approach will facilitate limited support to customer service agents.

Step 1: User submits a query in the system, e.g., user interacts with portal, chat box or the voice.

Step 2: Further, the system processes user fed inputs to find the set of relevant one or more knowledge articles.

Step 3: Enabling the customer service agent to traverse through one or more knowledge articles manually and find appropriate action to be taken (One knowledge article may contain multiple set of steps as per inputs).

Step 4: If right action is found then enabling the Customer Service Agent to execute that action manually.

Step 5: If right action is not found then enabling the Customer Service Agent to find right document manually.

Step 6: User feedback is used for further learning.

In another embodiment, for the fine grain approach the method facilitates enhanced support to the customer service agents by finding right knowledge article ID and identifying specific relevant section from the unstructured text within the knowledge article. Here, customer service agent responds to the user queries dynamically. This system creates the foundation for a fully automated system response to user queries with limited or without any intervention from customer service agents by understanding natural language queries of customers and to recommend or execute suitable action for it by finding suitable course of action in unstructured knowledge articles. This approach seems to be more promising and is very much required as well, but biggest hurdle in this approach is the requirement of huge corpus of training data to train the machine learning model(s) and training data has dependency on human intervention for annotating right context or section related to query at hand in related knowledge article. In self-service approach, the system 100 interacts with customer (also referred as customer service agent and interchangeably used herein) to know about the user's complaint through the chat query or the voice query. Further, the system is trained using the AI or ML algorithms as known in the art to identify the parameters associated with the user query. Self-service approach is an enhancement of fine grain approach as it helps in finding right section of steps in right knowledge article to be taken by user for a query, whereas self-service executes these steps automatically.

Step 1: customer submits complaint in system, e.g., user interacts with portal, chat box or voice.

Step 2: system parses natural language and analyzes inputs using NLP (natural language processing) techniques as known in the art.

Step 3: system understands through natural language processing capability and identifies user query and its solution. Further, the system filters out key concepts from the user inputs and maps them to required parameters for probable actions in system.

Step 4: In case, all parameters are not given by customer, then system interacts with the user to share more details. The system is trained with historical interactions and compares the one or more keywords available in new query with the knowledge base, if a suitable match is found directly then tries to resolve the query, otherwise it finds the difference between available keywords and required keywords based on the knowledge base and interacts with user for new parameters to be shared by user.

Step 5: Once all parameters are received, based on its learning from the knowledge base, system decides the action to be performed automatically.

Step 6: System triggers the action as per its learning to execute task.

Step 7: If the system is not able to find right action as per its learning then raises alert for it, so that concerned team can handle this customer complaint.

Step 8: System monitors the action taken by concerned team and captures learning from it, so that it can take this action next time automatically.

Figure 5B:
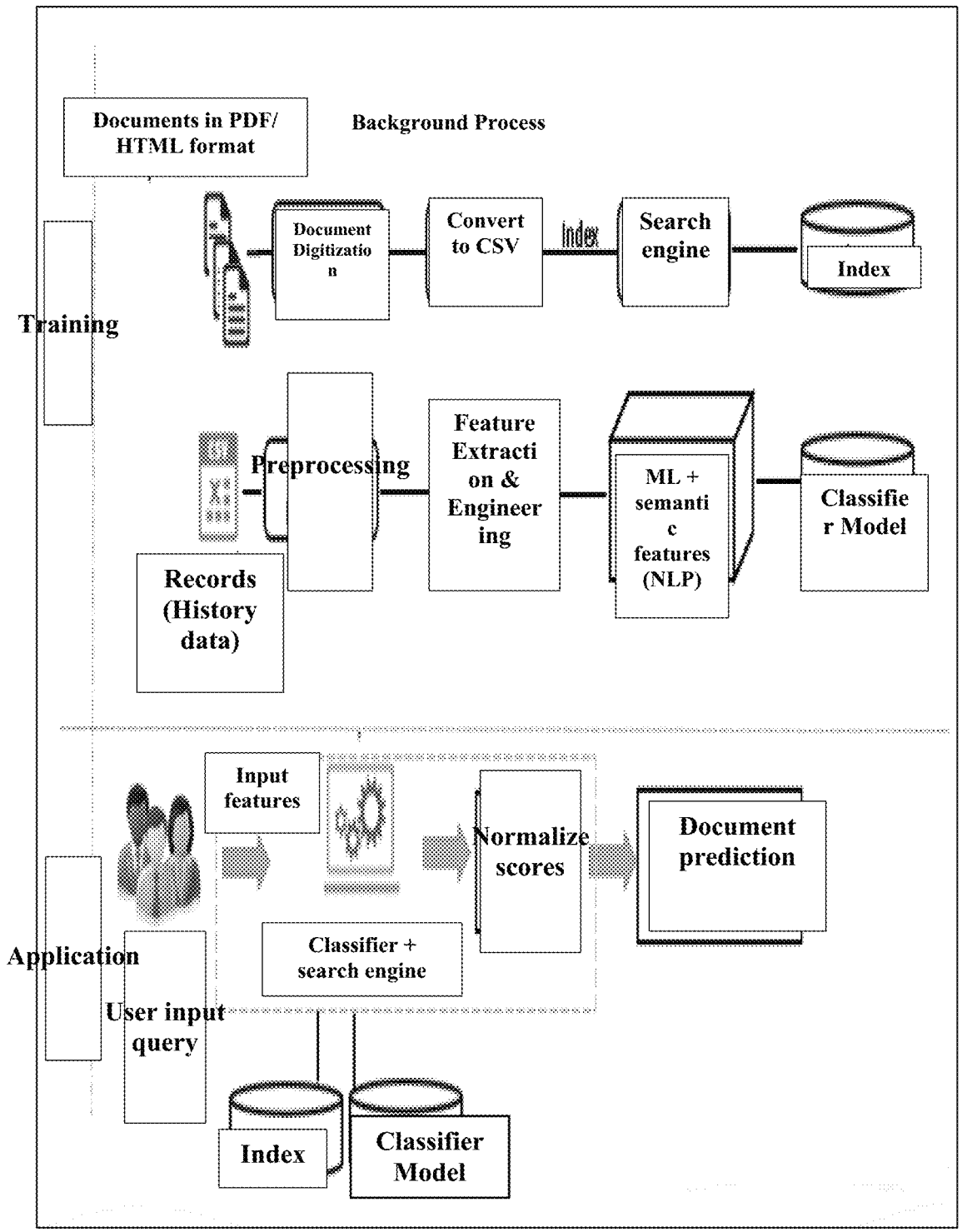
FIG. 5B and FIG. 5C illustrates a training model for the information filtering system, prediction and user feedback processes to update user persona using the system of FIG. 1, in accordance with some embodiments of the present disclosure.
Figure 5C:
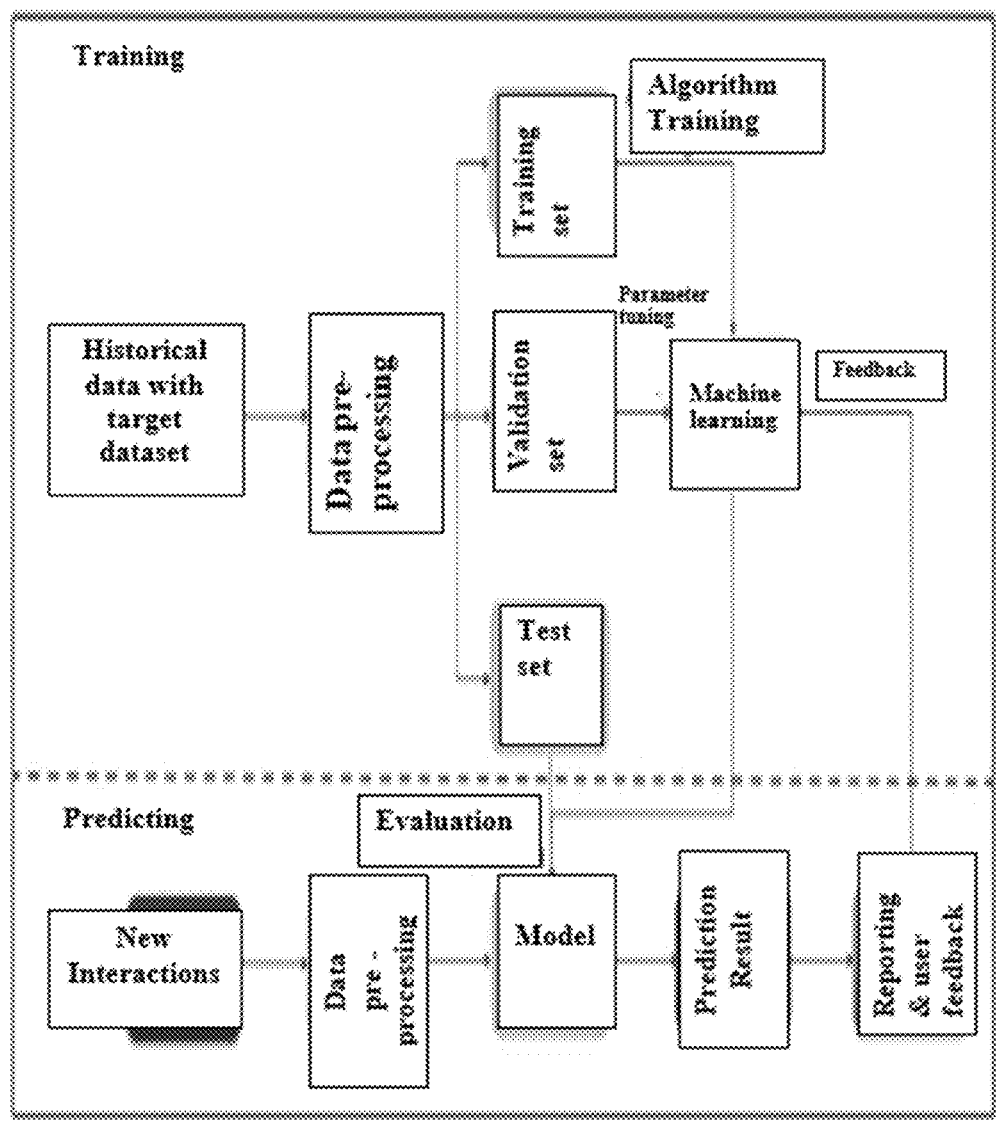

FIG. 5B and FIG. 5C illustrate a training model for the information filtering system, prediction and user feedback processes to update user persona using the system of FIG. 1, in accordance with some embodiments of the present disclosure. The present disclosure identifies suitable knowledge article or suitable section based on the context of interactions in knowledge articles associated with the trained model. Further, different classification and neural network algorithms are being (or can be) experimented based on the training process as depicted in the FIG. 5B. Once the model is trained, the trained model generates predictions for validation and testing. This model can be further used for predictions of new interactions as shown in FIG. 5C. The provision of feedback loop is provided for rating output predictions. Here, the customer service agents referred as one of the input to the system 100 submit their feedback for rightly classified knowledge articles. Domain experts or customer service agents can annotate, or tag suitable section associated with the knowledge article for new interaction, if annotation or tagging needs update or is not done correctly by system. Iteratively, training and learning process stabilize thereby contributing to annotation or tagging of sections in knowledge articles as well. The method of the present disclosure focuses in facilitating the right knowledge article and suitable context section for resolution of user queries.

Figure 6A:
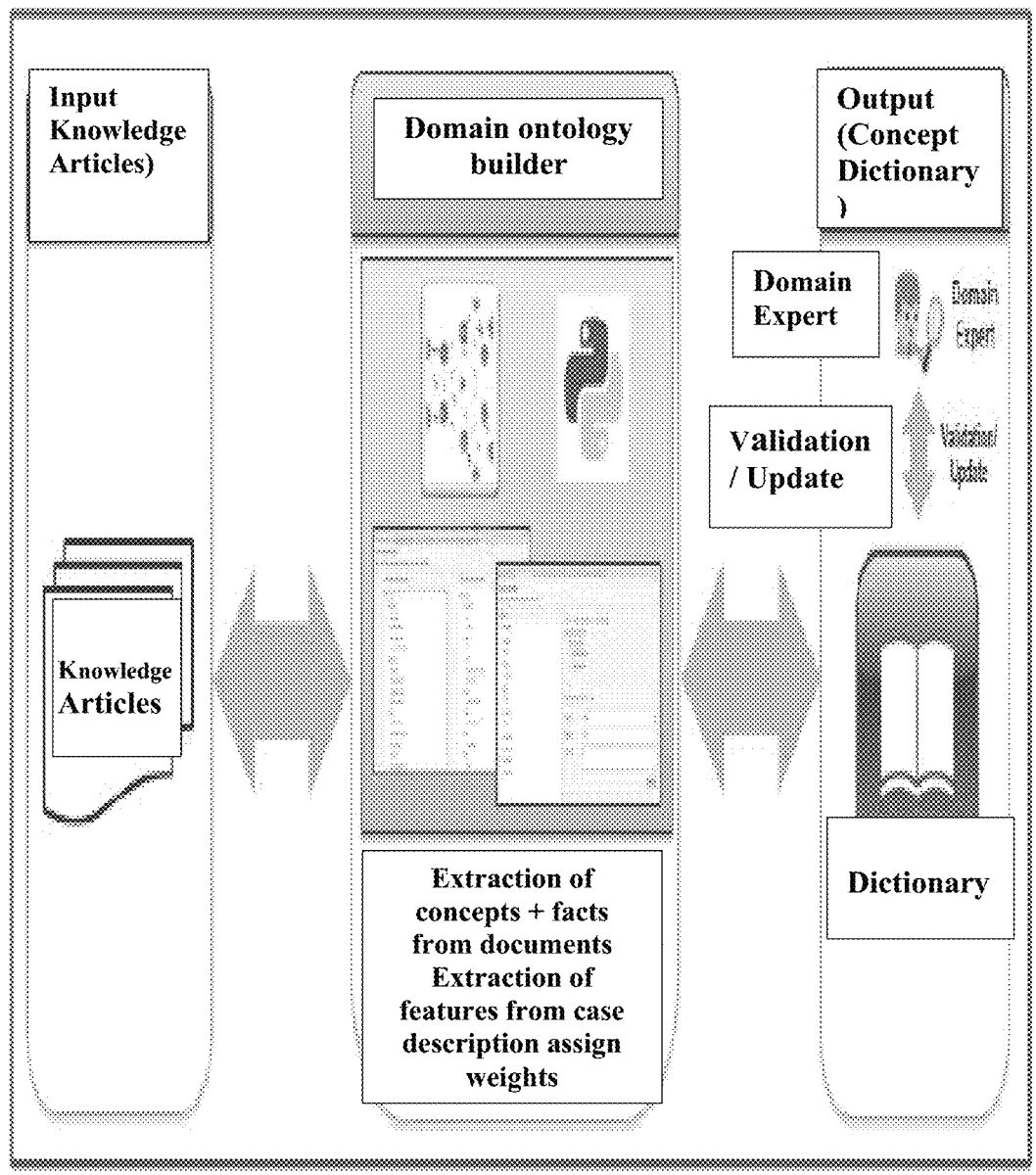
FIG. 6A illustrates an example depicting processing of user query dictionary creation of concepts using the knowledge articles using the system of FIG. 1, in accordance with some embodiments of the present disclosure.
Figure 6B:
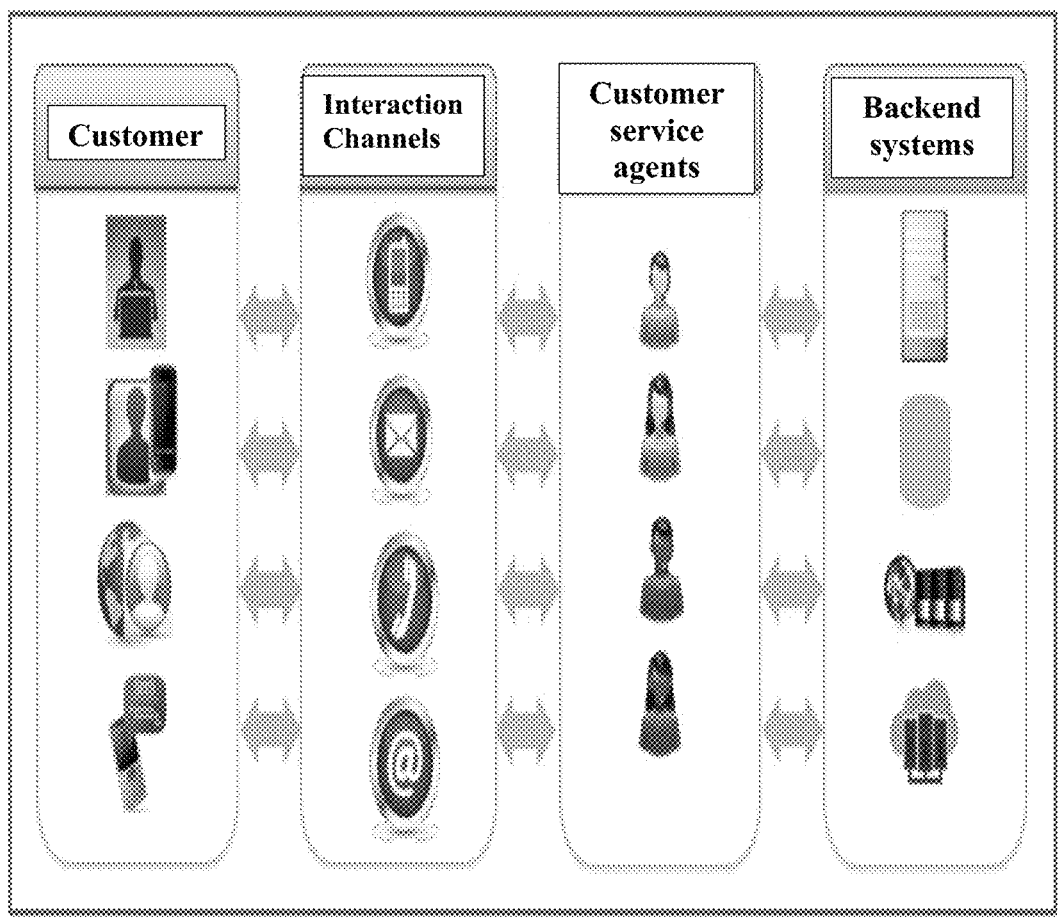
FIG. 6B illustrates an exemplary architecture depicting customer queries and resolution process using the system of FIG. 1, in accordance with some embodiments of the present disclosure.

FIG. 6B illustrates an exemplary architecture depicting customer queries and resolution process using the system of FIG. 1, in accordance with some embodiments of the present disclosure. In one embodiment, the fine grain approach is an enhancement of the coarse grain approach as the coarse grain approach helps in finding right knowledge article for finding right steps by the user query. The fine grain approach finds right section of steps in right knowledge article to be taken by the user for the query.

step 1: user submits complaint in system, e.g., user interacts with portal, chat box or voice.

step 2: system processes customer/user input to find the set of relevant documents and exact section of steps.

step 3: customer service agent follows steps for further actions, if right action is found then customer service executes that action manually.

step 5: if right action is not found then customer service executive finds right document and right section manually.

step 6: user feedback and dictionary created from domain ontology builder are used for further learning of system.

Figure 6C:
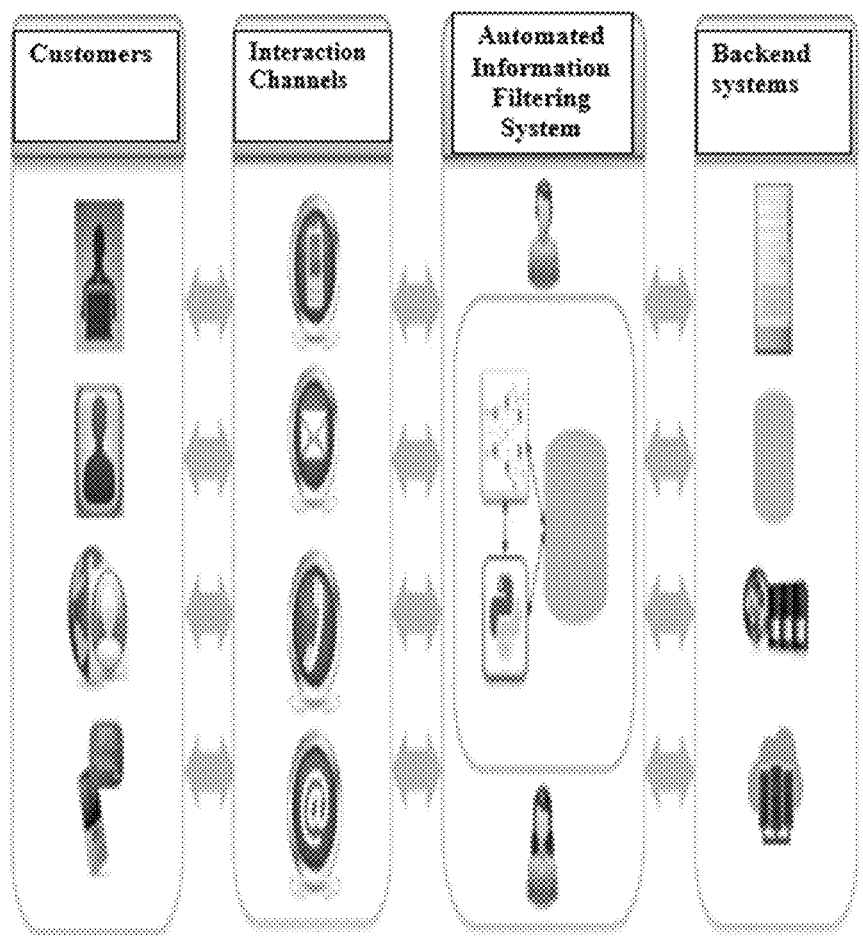
FIG. 6C illustrates an exemplary system depicting the information filtering system as intermediate system between customers interactions and backend systems for supporting customer service agents using the system of FIG. 1, in accordance with some embodiments of the present disclosure.

FIG. 6C illustrates an exemplary system depicting the information filtering system as intermediate system between customers interactions and backend systems for supporting customer service agents using the system of FIG. 1, in accordance with some embodiments of the present disclosure. The system 100 processes information at two levels first when interacting with user and finding resolution of user queries from databases. Here, advanced deep learning neural network technique is used at two levels of processing as follows, ensuring sufficiency of information in interaction: user submits his/her query in system and algorithm is trained to find gaps in interactions of users to resolve the query, for e.g., user wants to change the address of shipment for recently placed order for a product. The user shares order number and asks, whether address of shipment can be changed or not. The system 100 checks for order number in system and its status. If shipment is already shipped (status is 'after POLAR' i.e., status of product is after point of no return) then shipment address cannot be changed and the process is terminated by informing the user that change of address is not possible as products are already shipped. On the other hand, if shipment is not shipped (status is 'before POLAR' status of product is before point of no return) then shipment address can be changed. as product is not shipped, system 100 interacts with user to share new address and possible time of delivery. Once sufficiency of content is ensured by deep learning algorithm, then next level of execution is processed (explained in next point). inputs for ensuring sufficiency of information in interaction is ensured by training of lstm (long short term memory) based recurrent neural network deep learning algorithm through mapping of new interaction of user with historical interactions using dictionary of keywords as reference for controlled list of keywords as described below in Table 4,

TABLE 4

Training of Algorithm: System uses historical interactions and their status information in the knowledge base to train the model.

| Case ID | Interaction | Case Category | Status |
| --- | --- | --- | --- |
| 1234 | Please change my address of delivery for order number 987654321 dated 10 Jan. 2019. My new address is 123, XXX Lane, Mumbai. | Change | Before PONR |

Above historical interaction is mapped to dictionary keywords 'Change', 'Delivery', 'Address', 'New Address' and 'Before POLAR'. Processing of New Interaction: New Interaction's keywords are extracted with the help of Dictionary and then Deep Learning Neural Network based algorithm finds gap between relevant interactions with new interaction and then forms natural language query to be asked from user to get additional needed information as described below in Table 5,

TABLE 5

Example interaction scenario

| Case ID | Interaction | Case Category | Status |
|---|---|---|---|
| 7890 | I want to change my delivery address for order number 1234567890 dated 10 Dec. 2019. | Change | |

Above new interaction is mapped to dictionary keywords 'Change', 'Delivery' and 'Address'. System finds gap of 'New Address' and 'Before POLAR' keywords, system checks for shipment status within system and finds it to be 'Before POLAR'. Now system finds gap of 'New Address' keyword and forms a query for user as follows: "Yes, you can change your address. Please share your new address" Customer provides new address in response and system confirms sufficiency of information for further processing.

Referring now to FIG. 6A, in one embodiment, the present method processes the gaps in natural Language based query of user to sufficiency and information to resolve that query. The deep learning neural network algorithm is trained from historical interactions to find required keywords in queries. if any keyword is not made available by user then system forms one or more natural language questions for users to facilitate required information to fill gaps. Further, finding the right or relevant information in unstructured data: once system gets enough information needed to resolve a query, then system processes the user query to find suitable information or action from the repository based on training done for deep learning algorithm. algorithm uses inputs from user, status update from system and feedback status of user to learn and then predict right/relevant content or action for user. after ensuring sufficiency of information in new interaction is further processed with the help of lstm (long short-term memory) based recurrent neural network deep learning algorithm used for classification of text-based model, created through the knowledge base. Once prediction is generated to suggest knowledge article or steps of action by system, then user reviews the output and shares feedback.

Referring to the above example and the figure where the system uses historical interactions and knowledge article that was responded in the knowledge base to train the model. e.g., above the knowledge base includes interactions that were resolved with knowledge articles and their specific sections where steps are specified below in Table 6,

TABLE 6

Example interaction scenario

| Case ID | Interaction | Case Category | Status | Article_ID#Section_ID |
|---|---|---|---|---|
| 1234 | Please change my address of delivery for order number 987654321 dated 10 Jan. 2019. My new address is 123, XXX Lane, Mumbai. | Change | Before PONR | ABC1234#002 |
| 4567 | Please change my address of delivery for order number 987654312 dated 10 Feb. 2019. My new address is 234, XXX Lane, Mumbai. | Change | After PONR | ABC1234#004 |
| 4592 | Please cancel my order number 985554321 dated 10 Mar. 2019. | Cancellation | Before PONR | BCD2345#001 |

Processing of New Interaction: New interactions are processed through model generated from the knowledge base for example, as depicted in Table 7,

TABLE 7

Example interaction scenario

| Case ID | Interaction | Case Category | Status | Article ID |
|---|---|---|---|---|
| 7890 | I want to change my delivery address for order number 1234567890 dated 10 Dec. 2019. Yes, you can change your address. Please share your new address New Address is 456, XXXX Lane, Mumbai | Change | Before PONR | ? |

System predicts Knowledge Article ID and Section ID number ABC1234#002 further actions. The system of the present disclosure designs deep learning algorithm to convert natural language query into actionable insights, utilizing status of products in system.

| Case ID | Interaction | Case Category | Status | YES COUNT | NO COUNT | PARTIAL COUNT | Article_ID#Section_ID |
|---|---|---|---|---|---|---|---|
| 1234 | Please change my address of delivery for order number 987654321 dated 10 Jan. 2019. My new address is 123, XXX Lane, Mumbai. | Change | Before PONR | 1 | 0 | 0 | ABC1234#002 |
| 4567 | Please change my address of delivery for order number 987654312 dated 10 Feb. 2019. My new address is 234, XXX Lane, Mumbai. | Change | After PONR | 2 | 1 | | ABC1234#004 |
| 4592 | Please cancel my order number 985554321 dated 10 Mar. 2019. | Cancellation | Before PONR | 1 | 0 | | BCD2345#001 |

Feedback counts are also fed into neural network algorithm to decide the ranking of recommended knowledge articles. Feedback becomes more important in case of tie designing the deep learning algorithm to learn from status update of products from system and improved weights of keywords based on user feedback and then finding most suitable document/actions. Further, the role of feedback in processing for continuous learning for deep learning algorithm is very important and feedback processing described earlier plays an important role in comparing two or more documents or steps with similar keywords mapped from user interaction to targeted contents or actions. Base weights of keywords received from the domain ontology builders are further improved with the help of user feedback, then deep learning algorithm utilizes these weights in finding right information/actions. Shipment has been sent or not and incorporating user feedback in finding right information/action for user.

Figure 6D:
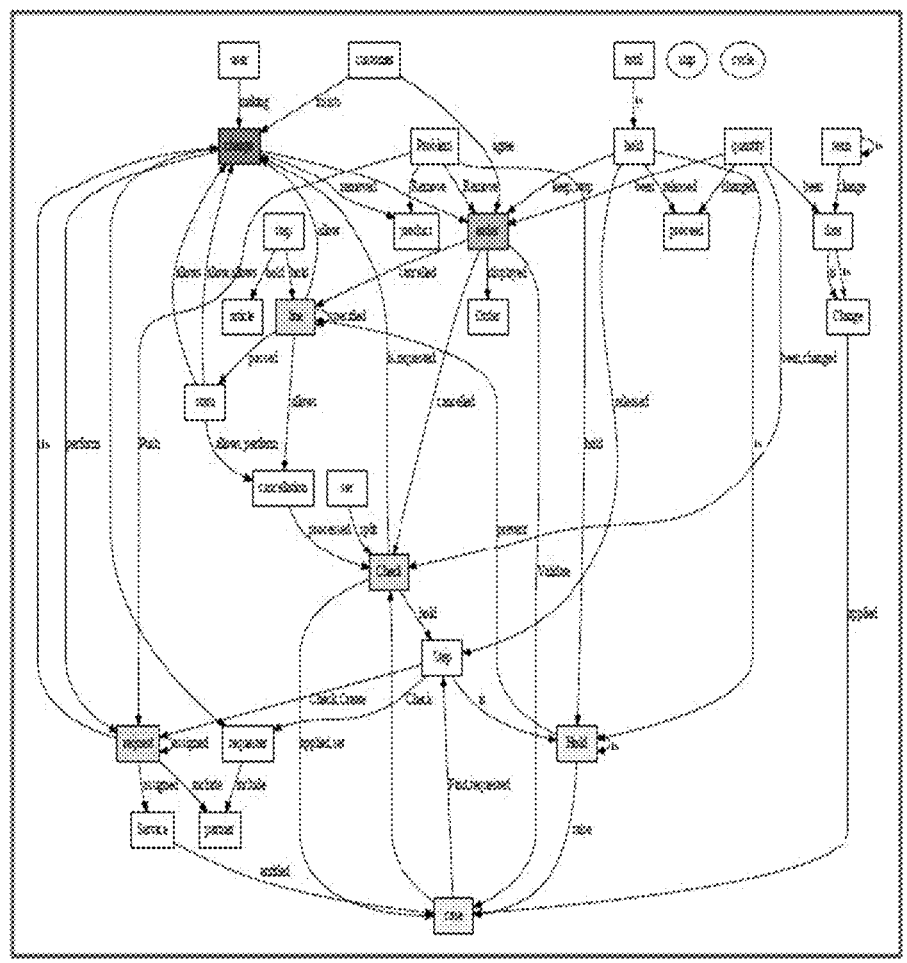
FIG. 6D illustrates a concept graphs of key concepts using a knowledge articles using the system of FIG. 1, in accordance with some embodiments of the present disclosure.

FIG. 6D illustrates a concept graphs of key concepts using a knowledge articles using the system of FIG. 1, in accordance with some embodiments of the present disclosure. In one embodiment, the annotation of tagging of data can be done in such a way that knowledge base of past interactions with referenced knowledge articles information is stored in repository for training of algorithm(s) for identifying suitable knowledge articles. Before training of algorithm to generate suitable model, there is a need to do pre-processing of data for making it suitable for learning of algorithms. Domain Experts can optionally contribute to collaborative section annotation in knowledge articles. As depicted, FIG. 7 illustrates concept graphs of key concepts using a knowledge articles using the system FIG. 1, according to some embodiment of the present invention. The Concepts Dictionary Creation is used to identify business terminology used in the knowledge articles, and there is a need to create a dictionary of all such keywords that are useful for identifying right context in knowledge articles. So first of all, dictionary of such keywords is created with the help of Domain Ontology Builder. The Domain Ontology Builder identifies all keywords used as subject and/or objects in the sentences with their weightage with respect to number of times appearing in the text. More useful concept or keyword can have darker color (or a specific pattern) as compared to concepts or keywords that appear less e.g., keywords that appear once only have white color (or any other distinguishable pattern), whereas keywords with frequency more than one have darker frequency (some other form of pattern or recognizable element representation). Outgoing Edges of keyword graph as represent subject, whereas incoming edges represent the use of keyword as an object in the sentence. This graph is created after natural language processing of contents in knowledge articles. Keywords with more incoming and outgoing edges have more weightage, but their weightage could be changed as per importance of that keyword or concept for resolution of queries in knowledge article. Such modifications to the weightages can be enabled or achieved via domain expert(s) inputs (e.g., using the interface provided by the portal of the system 100).

In one embodiment, all knowledge articles are processed in Domain Ontology Builder and a dictionary of Concepts and their respective mentions in the text are generated. This dictionary can be updated or modified (e.g., with the help of inputs from by domain expert(s) as one of the alternative option, wherein other options include intelligence and dynamic capability of the system 100 to update the dictionary with concepts and their weight) to add or modify concepts and their weightage can also be updated as per perceived weightage in comparison to other concepts. If any new knowledge article is added to repository, then concepts, mentions and weightage are updated in the dictionary. Further, training, and annotated data preparation from historical interactions, the knowledge base of past interactions with referenced knowledge articles information is stored in repository for training of algorithms for identifying suitable knowledge articles. Before training of algorithm to generate suitable model, there is a need to do pre-processing of data for making it suitable for learning of algorithms. domain experts can optionally contribute to collaborative section annotation in knowledge articles as depicted in FIG. 4A and FIG. 4B.

The written description describes the subject matter herein to enable any person skilled in the art to make and use the embodiments. The scope of the subject matter embodiments is defined herein and may include other modifications that occur to those skilled in the art. Such other modifications are intended to be within the scope of the present disclosure if they have similar elements that do not differ from the literal language of the embodiments or if they include equivalent elements with insubstantial differences from the literal language of the embodiments described herein.

The embodiments of present disclosure herein address unresolved problem of extracting information from contextual knowledge based on voice-based interactions. The disclosed method enables to extract information easier, faster, and cost-effective retrieval of knowledge articles. The method facilitates customer service agents to meet their timelines as agreed in service level agreements. It also helps in increasing customer satisfaction through timely resolution of their queries. Higher productivity and reduced costs through faster retrieval of right information and enhanced customer satisfaction leads to improve customer loyalty. Information filtering system as implemented by the present disclosure helps customer service agents in finding suitable knowledge articles based on interactions being done with customers. The system not only suggests knowledge article, but also suggests right or relevant section of the text, where suitable steps are specified. For achieving section level information retrieval, the present disclosure implements three approaches viz. Coarse grain approach, fine grain approach and self-service approach. Coarse grain approach can help in finding knowledge article IDs based on keywords used in natural language interactions done with customers, whereas fine grain approach can go one-step ahead by suggesting not only knowledge article, but also specific section of text with steps to be followed by customer service agents. In addition to these approaches, experimental results different algorithms have been presented in the present disclosure wherein it has been observed that deep learning neural networks tend to be performing better than other techniques and have listed the benefits of using this system. This system initially helps customer service agents in finding suitable knowledge articles ids and relevant sections within knowledge articles and gradually helps in fully automating customers' queries resolution process. The embodiments thus provide correct contextual knowledge extraction from the structured or the unstructured data to the user for queries posted through natural language or voice commands. Identification of incorrect, incomplete data elements to clean the data, update the missing elements of data for missing elements in interactions and knowledge articles and extracting information from all type of structured as well as unstructured sources of data, filtering it to match user's profile. The present disclosure and its method and system is (highly) customizable as per end user's requirements for preparation of extensive corpus for different domain contents is in progress and thus establishes standards for processing of unstructured and structured data.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated herein.

What is claimed is:

1. A processor implemented method for extracting contextual information from a knowledge base, the method comprising:
   receiving, via one or more hardware processors, a user query comprising a request to extract contextual information from the user query;
   analyzing, via the one or more hardware processors, the user query based on a plurality of predefined parameters to determine sufficiency of information comprised in the user query;
   mapping, via the one or more hardware processors, using a coarse grain approach, an information associated with the user query based on the sufficiency of information determined in the user query and a ranking score of one or more knowledge articles associated with a trained knowledge base; and
   extracting, via the one or more hardware processors, using a fine grain approach, an appropriate contextual information related to the user query based on the one or more knowledge articles associated with the trained knowledge base, wherein extracting the appropriate contextual information related to the user query using the fine grain approach comprises:
      generating, using a domain ontology builder, the knowledge base based on the one or more knowledge articles obtained from one or more external sources;
      obtaining, a plurality of entities for the user query based on the knowledge base, wherein the plurality of entities includes one or more keywords, an attribute, and a base weight; and
      computing, the ranking score for the contextual information associated with the user query based on the plurality of entities having closest mapping of the knowledge articles associated with the knowledge base, wherein computing the ranking score is based on the base weight and a concept count, and wherein the concept count is a ratio of total count of one or more concepts to one or more total words associated with closest mapped knowledge articles from the knowledge base.

2. The method as claimed in claim 1, wherein the base weight is determined based on the user feedback obtained from previous user queries.

3. The method as claimed in claim 1, wherein the coarse grain approach determines relevant information required from the knowledge articles associated with the user query.

4. A system for extracting contextual information from a knowledge base comprising:
   a memory storing instructions;
   one or more communication interfaces; and
   one or more hardware processors coupled to the memory via the one or more communication interfaces, wherein the one or more hardware processors are configured by the instructions to:
      receive, a user query comprising a request to extract contextual information from the user query;
      analyze, the user query based on a plurality of predefined parameters to determine sufficiency of information comprised in the user query;
      map, using a coarse grain approach, an information associated with the user query based on the sufficiency of information determined in the user query and a ranking score of one or more knowledge articles associated with a trained knowledge base; and
      extract, using a fine grain approach, an appropriate contextual information related to the user query based on the one or more knowledge articles associated with the trained knowledge base, wherein extracting the appropriate contextual information related to the user query using the fine grain approach comprises:
         generating, using a domain ontology builder, the knowledge base based on the one or more knowledge articles obtained from one or more external sources;
         obtaining, a plurality of entities for the user query based on the knowledge base, wherein the plurality of entities includes one or more keywords, an attribute, and a base weight; and
         computing, the ranking score for the contextual information associated with the user query based on the plurality of entities having closest mapping of the knowledge articles associated with the knowledge base, wherein computing the ranking score is based on the base weight and a concept count, and wherein the concept count is a ratio of total count of one or more concepts to one or more total words associated with closest mapped knowledge articles from the knowledge base.

5. The system as claimed in claim 4, wherein the base weight is determined based on the user feedback obtained from previous user queries.

6. The system as claimed in claim 4, wherein the coarse grain approach determines relevant information required from the knowledge articles associated with the user query.

7. One or more non-transitory machine-readable information storage mediums comprising one or more instructions which when executed by one or more hardware processors perform actions comprising:

receiving, via one or more hardware processors, a user query comprising a request to extract contextual information from the user query;

analyzing, via the one or more hardware processors, the user query based on a plurality of predefined parameters to determine sufficiency of information comprised in the user query;

mapping, via the one or more hardware processors, using a coarse grain approach, an information associated with the user query based on the sufficiency of information determined in the user query and a ranking score of one or more knowledge articles associated with a trained knowledge base; and extracting, via the one or more hardware processors, using a fine grain approach, an appropriate contextual information related to the user query based on the one or more knowledge articles associated with the trained knowledge base, wherein extracting the appropriate contextual information related to the user query using the fine grain approach comprises:

generating, using a domain ontology builder, the knowledge base based on the one or more knowledge articles obtained from one or more external sources;

obtaining, a plurality of entities for the user query based on the knowledge base, wherein the plurality of entities includes one or more keywords, an attribute, and a base weight; and computing, the ranking score for the contextual information associated with the user query based on the plurality of entities having closest mapping of the knowledge articles associated with the knowledge base, wherein computing the ranking score is based on the base weight and a concept count, and wherein the concept count is a ratio of total count of one or more concepts to one or more total words associated with closest mapped knowledge articles from the knowledge base.

8. The one or more non-transitory machine-readable information storage mediums of claim 7, wherein the base weight is determined based on the user feedback obtained from previous user queries.

9. The one or more non-transitory machine-readable information storage mediums of 7, wherein the coarse grain approach determines relevant information required from the knowledge articles associated with the user query.

\* \* \* \* \*